United States Patent
Fuchs et al.

(10) Patent No.: US 11,249,974 B1
(45) Date of Patent: Feb. 15, 2022

(54) PARTITION KEY/VALUE PAIR SORTING AND SPLITTING TECHNIQUES

(71) Applicant: Amazon Technologies, Inc., Seattle, WA (US)

(72) Inventors: Adam P. Fuchs, Issaquah, WA (US); John Vines, Medford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 252 days.

(21) Appl. No.: 16/699,502

(22) Filed: Nov. 29, 2019

(51) Int. Cl.
- G06F 7/02 (2006.01)
- G06F 16/00 (2019.01)
- G06F 16/22 (2019.01)
- G06F 16/93 (2019.01)
- G06F 3/06 (2006.01)

(52) U.S. Cl.
CPC ...... *G06F 16/2282* (2019.01); *G06F 16/2255* (2019.01); *G06F 16/93* (2019.01); *G06F 3/0644* (2013.01)

(58) Field of Classification Search
CPC .. G06F 16/2282; G06F 16/93; G06F 16/2255; G06F 3/0644
See application file for complete search history.

(56) References Cited

U.S. PATENT DOCUMENTS

| | | | |
|---|---|---|---|
| 2015/0134795 A1* | 5/2015 | Theimer | G06F 16/254 709/223 |
| 2017/0177601 A1* | 6/2017 | Borate | G06F 16/2228 |
| 2018/0239808 A1* | 8/2018 | Koochakzadeh | G06F 16/278 |

OTHER PUBLICATIONS

Balasubramanian, Gowri, "Choosing the Right DynamoDB Partition Key," Feb. 20, 2017, taken from AWS Database Blog, http://aws.amazon.com/blogs/database/Choosing-the-Right-DynamoDB-Partition-Key (Year: 2017).*

* cited by examiner

Primary Examiner — Bruce M Moser
(74) Attorney, Agent, or Firm — Davis Wright Tremaine LLP

(57) ABSTRACT

A system assigns a byte value to document identifiers in a table. The table includes forward and secondary indexes referenced in key/value pairs of the table, and the keys of the key/value pairs each include a document identifier. The system defines byte ranges, and each of the byte ranges includes a byte value of one of the byte values assigned to the document identifiers. Document identifiers are located in the table using their associated byte values. Keys of the located document identifiers are modified to include a reference to a byte range that encompasses the byte value associated each of the identified document identifiers.

20 Claims, 12 Drawing Sheets

| Partition ID | Index Type | Index Key | Qualifier | | Value |
|---|---|---|---|---|---|
| 0x000080 | D | DOCID2 | Field3 | | C |
| 0x000080 | G | RelClass1-in | DOCID1 | DOCID2 | E |
| 0x000080 | G | RelClass1-in | DOCID3 | DOCID2 | F |
| 0x000080 | L | RelClass1-out | DOCID2 | DOCID1 | E |
| 0x000080 | L | RelClass1-out | DOCID2 | DOCID3 | F |
| 0x000080 | V | Field3 | C | DOCID2 | |
| 0x0001 | D | DOCID1 | Field1 | | B |
| 0x0001 | D | DOCID1 | Field2 | | A |
| 0x0001 | D | DOCID3 | Field1 | | D |
| 0x0001 | G | RelClass1-out | DOCID2 | DOCID1 | E |
| 0x0001 | G | RelClass1-out | DOCID2 | DOCID3 | F |
| 0x0001 | L | RelClass1-in | DOCID1 | DOCID2 | E |
| 0x0001 | L | RelClass1-in | DOCID3 | DOCID2 | F |
| 0x0001 | V | Field1 | B | DOCID1 | |
| 0x0001 | V | Field1 | D | DOCID3 | |
| 0x0001 | V | Field2 | A | DOCID1 | |

520

| Partition ID | Index Type | Index Key | Qualifier | | Value |
|---|---|---|---|---|---|
| 0x0001 | D | DOCID1 | Field1 | | B |
| 0x0001 | D | DOCID1 | Field2 | | A |
| 0x0001 | D | DOCID3 | Field1 | | D |
| 0x0001 | G | RelClass1-out | DOCID2 | DOCID1 | E |
| 0x0001 | G | RelClass1-out | DOCID2 | DOCID3 | F |
| 0x0001 | L | RelClass1-in | DOCID1 | DOCID2 | E |
| 0x0001 | L | RelClass1-in | DOCID3 | DOCID2 | F |
| 0x0001 | V | Field1 | B | DOCID1 | |
| 0x0001 | V | Field1 | D | DOCID3 | |
| 0x0001 | V | Field2 | A | DOCID1 | |

116

File Storage Layer 108

| Partition ID | Index Type | Index Key Qualifier | | | Value |
|---|---|---|---|---|---|
| 0x0001 | D | DOCID1 | Field1 | | B |
| 0x0001 | D | DOCID1 | Field2 | | A |
| 0x0000C0 | D | DOCID3 | Field1 | | D |
| 0x0001 | G | RelClass1-out | DOCID2 | DOCID1 | E |
| 0x0000C0 | G | RelClass1-out | DOCID2 | DOCID3 | F |
| 0x0001 | L | RelClass1-in | DOCID1 | DOCID2 | E |
| 0x0000C0 | L | RelClass1-in | DOCID3 | DOCID2 | F |
| 0x0001 | V | Field1 | B | DOCID1 | |
| 0x0000C0 | V | Field1 | D | DOCID3 | |
| 0x0001 | V | Field2 | A | DOCID1 | |

116A

| Partition ID | Index Type | Index Key Qualifier | | | Value |
|---|---|---|---|---|---|
| 0x0000C0 | D | DOCID3 | Field1 | | D |
| 0x0000C0 | G | RelClass1-out | DOCID2 | DOCID3 | F |
| 0x0000C0 | L | RelClass1-in | DOCID3 | DOCID2 | F |
| 0x0000C0 | V | Field1 | D | DOCID3 | |
| 0x0001 | D | DOCID1 | Field1 | | B |
| 0x0001 | D | DOCID1 | Field2 | | A |
| 0x0001 | G | RelClass1-out | DOCID2 | DOCID1 | E |
| 0x0001 | L | RelClass1-in | DOCID1 | DOCID2 | E |
| 0x0001 | V | Field1 | B | DOCID1 | |
| 0x0001 | V | Field2 | A | DOCID1 | |

PARTITION KEY/VALUE PAIR SORTING AND SPLITTING TECHNIQUES

BACKGROUND

A number of database technologies currently address data processing challenges presented when processing and searching large data sets (e.g., data sets on the order of terabytes and petabytes). Some database technologies implement a sorted, distributed key/value stores. Such database technologies store data in partitions, where each partition includes sorted or sortable key/value pairs. A database technology, such as these, may provide mechanisms that associate keys with values, provide an interface for inserting keys with their associated values (in any order), and provide an efficient interface for retrieving ranges of keys and their associated values in sorted order. An indexed set of key/value pairs that are directly accessed and queried through such mechanisms may be referred to as a forward index of key/value pairs. The forward index is also known as a primary store of one or more partitions associated with a table.

It is also possible to perform queries on secondary indexes that are related to forward indexes. A secondary index is a collection of information that is used to optimize particular types of searches and queries against the sorted key/value pairs of a forward index. It is known to store a secondary index in a way that is co-partitioned, such as in a partition, with the data to which the index entries refer. This technique is known as document-distributed indexing. A document-distributed index (or co-partitioned index) is a secondary index in which each index entry which refers to an object in the forward index is kept in the same partition as the object to which it refers. Partitions storing key/value pairs associated with forward and secondary indexes may be split as their size approaches a maximum size in bytes (e.g., 50 GB) or observed query performance decreases. However, maintaining the co-partitioning of the forward and secondary indexes when a partition is split is challenging and non-trivial.

BRIEF DESCRIPTION OF THE DRAWINGS

Various techniques will be described with reference to the drawings, in which:

FIG. 7 shows an illustrative example of generating a partition from the modified table illustrated in FIG. 6;

FIG. 9 shows an illustrative example of two partitions generated from splitting the partition illustrated in FIG. 8;

DETAILED DESCRIPTION

Figure 1:
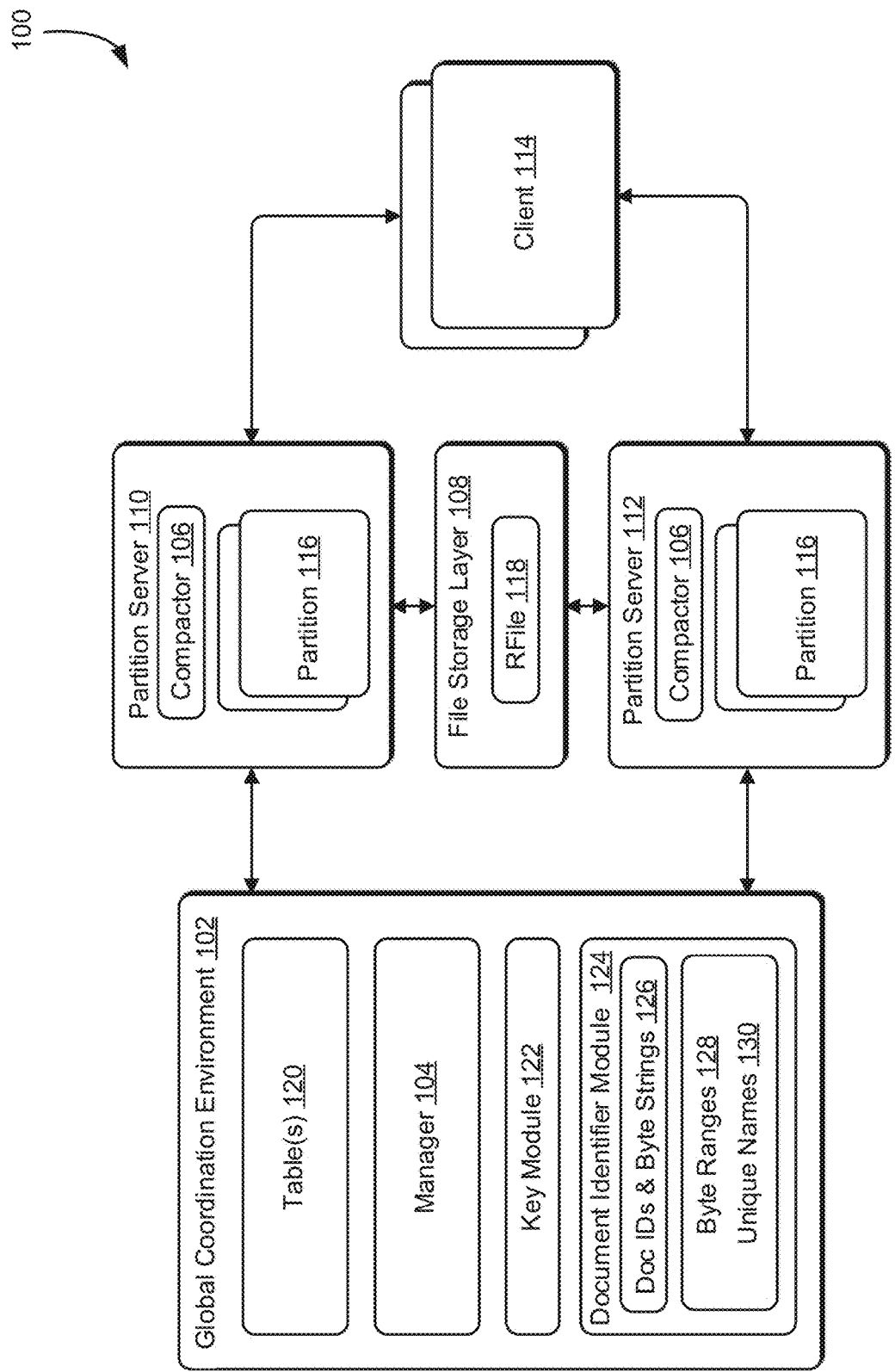
FIG. 1 shows an illustrative example of a database environment that may implement the described hashing technology and system modules that incorporate the hashing technology.

Described implementations provide mechanisms for sorting or splitting a partition or table that includes associated forward and secondary indexes. For example, a hashing technology is provided that allows database technology that uses key/value pairs to maintain co-partitioning of forward and secondary indexes when a table or partition is split. The following will describe the processing involved to sort and split a partition. The same processing applies to a table.

Partitions may be allocated to store related forward and secondary indexes associated with a table. However, splitting those partitions as they approach a maximum size in bytes (e.g., 50 GB) or observed query performance decreases is difficult because some database mechanisms do not effectively support maintaining co-partitioning of forward and secondary indexes when a partition is split. The hashing technology allows any database technology that uses key/value pairs to maintain co-partitioning of forward and secondary indexes when a partition is split.

A forward index associated with a partition includes sorted and searchable key/value pairs. A secondary index in the partition may include key values also found in the forward index. For example, such a key value may be a document identifier, such as a document ID (DOCID), that corresponds to a hierarchical document that has one or more fields. In general, the secondary index is a collection of information that is used to optimize particular types of searches and queries against a forward index having sorted key/value pairs.

The hashing technology assigns a unique byte string to a document identifier that is in the forward index and the secondary index. There may be multiple such document identifiers and each of those document identifiers is assigned a unique byte string. That unique byte string may be a SipHash byte string. SipHash byte strings may be ordered and stored lexicographically.

The hashing technology also defines one or more byte ranges. Each of the byte ranges is unique and is defined by upper and lower byte values, and each of the byte ranges contains a value of at least one of the SipHash byte strings. Each of the byte ranges is allocated a unique name. That unique name may be derived from the upper byte boundary of a corresponding byte range. For example, the unique name may be a byte string value derived from the upper byte boundary of a corresponding byte range. The byte ranges are used to partition and sort key/value pairs in a partition that includes forward and secondary indexes.

Partitions are generally sorted by index (i.e., forward and secondary indexes). The hashing technology allows for modifying the sorting in a partition by adding a unique name of a byte range to each key/value pair in the partition. The hashing technology searches the partition to identify key/value pairs that include document identifiers that have assigned SipHash byte strings. Each of the key/value pairs identified is modified to include a reference to a byte range that includes the SipHash byte string for identified key/value pairs. Specifically, each of the identified key/value pairs is modified to include a partition ID entry that includes the unique name of the byte range that corresponds to the document identifier located in the identified key/value pairs. The resulting modified partition includes key/value pairs that have partition ID entries with the unique names that correspond to the document identifiers in the key/value pairs associated with the partition.

Standard sorting tools in key/value based database technologies may be used to index key/value pairs in the partition based on the unique name in the partition ID entry associated with the keys. Indexing in this manner ensures that document identifiers linked to key/value pairs of related forward and secondary indexes are clustered together in the partition. It is also possible to filter the key/value pairs using the unique name in the partition ID entry associated with the keys.

A partition including key/value pairs that include partition ID entries with the unique names that correspond to the document identifiers in the key/value pairs associated with the partition may be split using the disclosed hashing technology. It may be beneficial to split a partition with such defined key/value pairs when the partition approaches a maximum size threshold, or when query or sorting performance approaches or falls below a minimum performance threshold.

The hashing technology will create a new split point for the partition. The new split point will have a unique name that is associated with a new byte range that is unique and is defined by upper and lower byte values. A document identifier in the partition that has a SipHash byte string that falls within the new byte range should be allocated to the new partition. The hashing technology searches the partition to identify document identifiers that fall within the new byte range, and changes the partition ID entries of the keys/value pairs associated with the identified document identifiers to reference the unique name of the new byte range. The modified partition now has at least two unique names in the partition ID entries of the key/value pairs referenced in the partition.

A major compaction operation may be used to generate two partitions and corresponding record files (RFiles), also referred to as database files, once the split point is established in the partition. However, that major compaction operation can be delayed. Splitting the partition, as described in the foregoing, creates two partitions that reference the same RFile that was previously referenced by the partition before it was split using the described hashing technology. Therefore, before the major compaction operation occurs, a logical abstraction of the key/value pairs, facilitated by the SipHash byte strings associated with the document identifiers and the byte ranges that encompass those SipHash byte strings, exists that allows sorting and lookups of the key/value pairs in the two partitions.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Using the techniques and technologies described herein for sorting and splitting tables and partitions that include forward and secondary indexes, the key/value pairs associated with such indexes may be consistently co-partitioned when splitting a table and/or partition is required based on storage or query performance parameters. As one skilled in the art will appreciate in light of this disclosure, certain embodiments may be capable of achieving certain advantages, including some or all of the following: (1) improving conventional database software technologies that implement sortable key/value pairs with a hashing technology that can dynamically split tables and partitions with minimal user intervention; (2) reducing the use of computing resources previously required when a table or partition including co-partitioned key/value pairs was manually analyzed and sorted prior to splitting the table or partition; (3) improving database ingest and thereby reducing use of computing resources by providing a table and partition splitting technology that reacts quickly to scaled data inflow with minimal human input; (4) reducing database downtime, particularly during peak use of database partitions, by delaying rewrites of data and generation of new database files when a table or partition is split using the disclosed hashing technology; and so on.

FIG. 1 illustrates a database environment 100 that may implement the described hashing technology and system modules that incorporate the hashing technology. The database environment 100 may be implemented by a computing device with storage or a plurality of such computing devices coupled together over a wireless or wireline network, such as the Internet, an intranet, or the like. In some implementations, the database environment 100 incorporates a key/value pair database and Hadoop technologies. The database technology may run on top of Hadoop and provides unique cell-level access control that is not commonly available in other non-relational, e.g., NoSQL, databases. In addition, the key/value pair database technology may provide data management features such as iterators, which provide key data retrieval functions.

The key/value pair database technology provides a sorted, distributed key-value data store in which keys comprise a five (5)-tuple structure: row (controls atomicity), index type (controls locality), index key qualifier (controls uniqueness), visibility label (controls access), and timestamp (controls versioning). A key must not include all the indicated elements. Values associated with the keys can be text, numbers, images, video, or audio files. Visibility labels are generated by translating an organization's existing data security and information sharing policies into Boolean expressions over data attributes. In database technology, a key/value pair may have its own security label that is stored under the column visibility element of the key and that, when present, is used to determine whether a given user meets security requirements to read the value. Interaction with database technology may take place through a query layer that is implemented via an application programming interface (API). A typical query layer is provided as a web service (e.g., using Apache Tomcat).

The described hashing technology may be used in cooperation with a database technology that maintains sorted key/value pairs and implements mechanisms that associates keys with values, provides an interface for inserting keys with their associated values (in any order) into tables and partitions, and provides an efficient interface for retrieving ranges of keys and their associated values in sorted order. The set of key/value pairs that are directly accessed through the API is sometimes referred to as a primary store. This disclosure will refer to such a primary store as a table.

Within this context, a table is a collection of sorted key/value pairs that is accessed and managed independently, and a partition is a partition of a table that contains all of the key value pairs in a given sub-range of keys. In some implementations, the database technology comprises a sorted key/value technology built on top of Hadoop and that provides these characteristics, as has been described. In a typical implementation, the database technology manages tables, distributing and hosting their partitions throughout a cluster of partition servers. A partition server typically is implemented in software that executes on a computing device. The database technology's API supports ingest of key/value pairs, grouped into atomically applied objects known as mutations, using a mechanism known as the batchwriter. The database technology may also support streaming ranges of key/value pairs back to client applications using a mechanism known as a scanner, which has a batched variant called the batchscanner. Using these mechanisms, the database technology supports efficient ingest and query of information as long as the queries are aligned with the keys' sort order.

To support queries that are not aligned with the primary sort order in a table (or partition), applications either must rely on (1) table scans to do a brute force evaluation of the queries, or (2) leverage an index and perform a secondary lookup in the table(s). Such secondary lookups may be accomplished using a secondary index. As indicated, a secondary index is a collection of information that is used to optimize particular types of searches and queries against the sorted key/value of a forward index. It is known to store a secondary index in a way that is co-partitioned with the data to which the index entries refer, such as the data referenced in a forward index. This technique is known as document-distributed indexing. A document-distributed index (or co-partitioned index) is a secondary index in which each index entry, which refers to an entry in a forward index, is kept in the same partition (e.g., partition) as the object to which it refers. Document-distributed indexing has many benefits over other techniques, including its ability to leverage the hardware parallelism supported by clusters of processors, its ability to perform index joins in a distributed fashion, and its resistance to hot spots, in which many queries require concurrent access to a small subset of computing resources. Co-partitioning secondary index entries means that partitions of the secondary index must follow related forward index entries and be co-hosted on the same computing resources as the forward index entries.

With the above as background, the techniques of this disclosure are now described in detail. As will be understood, these techniques provide for technologies that establish or maintain co-partitioning of forward and secondary indexes at the table or partition level. By way of example only, the detailed discussion is based on database technology that implements tables and partitions and actions on indexes so co-partitioning of forward and secondary indexes is achieved or maintained. The described technologies may be used with any database technology with a design that uses key/value pairs.

Referring to FIG. 1, the database environment 100 is illustrated as including a global coordination environment 102. The global coordination environment 102 may include various conventional modules, the manager 104. A compactor 106, which may be associated with each of partition servers 110 and 112, functions to provide minor and major compaction processes, such as flushing emerging activities associated with data buffered and stored in memory and background operations used to generate and merge files stored in a file storage layer 108. The file storage layer 108 may be a distributed file system, such as a Hadoop distributed file system (HDFS). The file storage layer 108 may host one or more RFiles 118 generated when tables and partitions undergo compaction.

The manager 104 manages the cluster and failovers of the global coordination environment 102 and/or the partition servers 110 and 112. For example, the manager 104 communicates with the global coordination environment 102 to register the global coordination environment 102 and the partition servers 110 and 112. A client(s) 114 may communicate with the manager 104 to look up the global coordination environment 102, find the partition server 110 or 112 addresses, look up root directories, and the like. The client 114 sometimes directly communicates with the global coordination environment 102 and the partition server 110 or 112. The manager 104 is illustrated as being associated with the global coordination environment 102. In the alternative, the manager 104 may be a separate node or cluster of notes.

The global coordination environment 102 is a coordinator responsible for, among other things, coordinating the partition servers 110 and 112. For example, the global coordination environment 102 can assign partitions 116 linked to one or more tables 120 to partition servers 110 and/or 112, detect failures of partition servers 110 or 112, perform administrative functions, load balance across partition servers 110 and 112, check the health of the partition servers 110 and 112, and the like.

The global coordination environment 102 also includes a key module 122 and a document identifier module 124. The key module 122 and the document identifier module 124 implement the described hashing technology. Functionality of the hashing technology applies to the table 120 and the partitions 116. However, as indicated previously, the description herein will focus mainly on the application of the hashing technologies to one or more of the partitions 116.

The partition 116 may include a forward index of sorted and searchable key/value pairs. A secondary index in the partition 116 may include key values also found in the forward index. For example, such a key value may be a document identifier, such as DOCID, that corresponds to a hierarchical document that has one or more fields. In general, a secondary index is a collection of information that is used to optimize particular types of searches and queries against a forward index having sorted key/value pairs. The document identifier module 124 assigns a unique byte string to a document identifier that is in the forward index and the secondary index. There may be multiple such document identifiers, and each of those document identifiers is assigned a unique byte string. That unique byte string may be a SipHash 2-4 byte string, or similar unique hexadecimal string. In general, a SipHash is a keyed pseudorandom function (PRF). A SipHash is constructed using compression C and finalization D rounds (noted as SipHash-C-D). A round is called SipRound, and is a combinational transformation. The number of compression and finalization rounds can be changed depending on the implementation. The choice affects the strength of security.

SipHash 2-4 byte strings may be ordered and stored lexicographically by the document identifier module 124. More particularly, the document identifier module 124 stores each document identifier and associated unique byte string 126 in order to, among other things, facilitate iterating the partition 116.

The document identifier module 124 further provides for defining and storing one or more byte ranges 128. Each of the byte ranges 128 is unique and is defined by upper and lower byte values, and each of the byte ranges 128 contains a value of at least one of the SipHash 2-4 byte strings. Each of the byte ranges 128 is allocated a unique name 130. That unique name 130 may be derived from the upper byte boundary of a corresponding byte range 128. The byte ranges 128 may include an exclusive lower bound and an inclusive upper bound. In naming these byte ranges 128, the document identifier module 124 prepends two bytes to the upper bound, so byte range (0x00,0x80] would have the unique name 0x000080 130. A second byte range (0x80,∞] does not have an upper bound, so the unique name 130 set by the document identifier module 124 is 0x0001. The byte ranges 128 are used to partition and sort key/value pairs in a partition that includes forward and secondary indexes. The unique name 130 associated with each of the byte ranges 128 may be stored by the document identifier module 124 and linked to a related byte range 128.

The partitions 116 are generally sorted by index (i.e., forward and secondary indexes). The hashing technology allows for modifying the sorting in a partition 116 by adding a unique name 130 of a byte range 128 to each key/value pair in the partition 116. The key module 122 is responsible for leveraging the information stored by the document identifier module 124 and modifying the partition 116 in such a manner.

The key module 122 searches the partition 116 to identify key/value pairs that include document identifiers that have assigned SipHash 2-4 byte strings. Each of the key/value pairs identified in the partition 116 is modified to include a reference to a byte range 128 that includes the SipHash 2-4 byte string for identified key/value pairs. Specifically, each of the identified key/value pairs in the partition 116 is modified to include a partition ID entry that includes the unique name 130 of the byte range 128 that corresponds to the document identifier located in the identified key/value pairs. The resulting modified partition 116 includes key/value pairs that have partition ID entries with the unique names 130 that correspond to the document identifiers in the key/value pairs associated with the partition 116.

Standard sorting tools in key/value based database technologies may be used to index key/value pairs in the partition 116 based on the unique name 130 in the partition ID associated with the keys. Indexing in this manner ensures that document identifiers linked to key/value pairs of related forward and secondary indexes are clustered together in the partition 116. In another operation, which can also be considered a type of sorting, the partition 116 may be de-interleaved based on the unique name 130 in the partition ID associated with the keys. This type of sorting process involves a filter operation for each of the unique names 130 associated with the partition 116.

A partition 116 including key/value pairs that include partition ID entries with the unique names 130 that correspond to the document identifiers in the key/value pairs associated with the partition 116 may be split using the disclosed hashing technology. It may be beneficial to split a partition 116 with such defined key/value pairs when the partition 116 approaches a maximum size threshold, or when query or sorting performance approaches or falls below a minimum performance threshold.

The hashing technology will create a new split point for the partition 116. The new split point will have a unique name 130 that is associated with a new byte range 128 that is unique and is defined by upper and lower byte values. A document identifier in the partition 128 that has a SipHash 2-4 byte string that falls within the new byte range 128 should be allocated to the new partition 116. The hashing technology searches the partition 116 to identify document identifiers that fall within the new byte range 128, and changes the partition ID entries of the keys/value pairs associated with the identified document identifiers to reference the unique name 130 of the new byte range 128. The modified partition 116 now has at least two unique names 128 in the partition ID entries of the key/value pairs referenced in the partition 116.

A major compaction operation, facilitated by the compactor 106, may be used to generate two partitions 116 and corresponding RFiles 118 once the split point is established in the partition 116. However, that major compaction operation can be delayed. Splitting the partition 116, as described in the foregoing, creates two partitions 116 that reference the same RFile 118 that was previously referenced by the partition 116 before it was split using the described hashing technology. Therefore, before the major compaction operation occurs, a logical abstraction of the key/value pairs, facilitated by the SipHash 2-4 byte strings associated with the document identifiers and the byte ranges 128 that encompass those SipHash 2-4 byte strings, exists that allows sorting, filtering and lookups of the key/value pairs in the two partitions 116.

Figure 2:
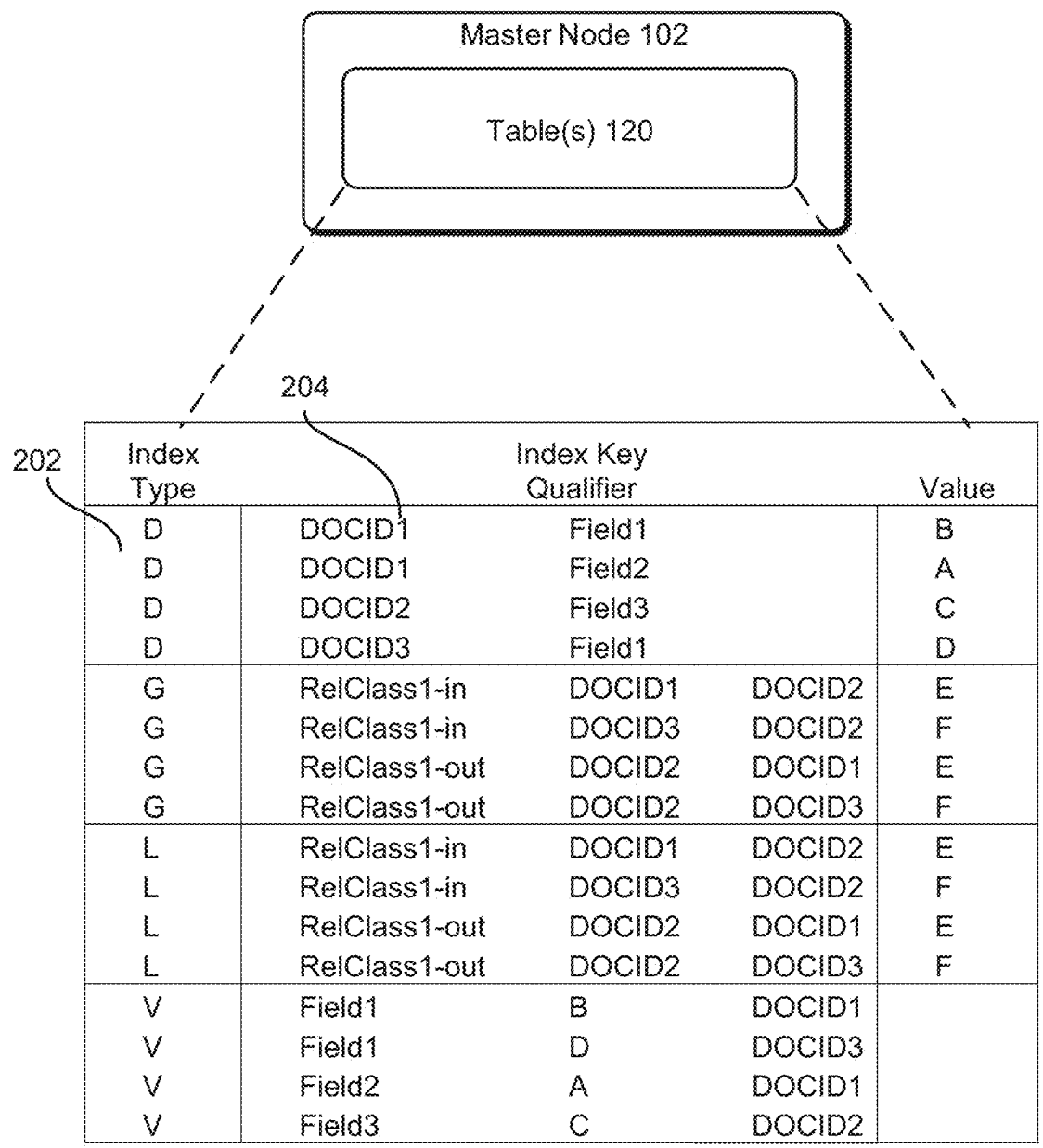
FIG. 2 shows an illustrative example of a table associated with a global coordination environment of the database environment illustrated in FIG. 1.

FIG. 2 illustrates the table 120 associated with the global coordination environment 102. The table 120, alternatively, could be a partition 116 hosted by one of the partition servers 110 or 112. Prior to application of the hashing technology, the table 120 represents a document-partition collection of indexes sorted by index type with row entries 202 identifying a particular type of index. In this example, indexes D and L are forward indexes. In particular, index D is a document index and index L is a graph index. Indexes V and G are secondary indexes. Specifically, index V is a field value index and index G is an inverted graph index.

The table 120 also includes key values 204 that specify a particular DOCID. In this example, the table 120 includes DOCID1, DOCID2 and DOCID3. The number of DOCIDs is by way of example only, as there could be any number of DOCIDs in the table 120. DOCIDs in this context are document identifiers that each correspond to a hierarchical document that has one or more fields (such as "field1"), and each of the fields may include one or more subfields (such as "subfield1" and "subfield2" associated with field1), and those the fields may have relationships to fields in other hierarchical documents. The described hashing technology is provided to achieve document-partitioning so that entries across all indexes associated with a particular document (e.g., DOCID#) are co-partitioned in the same table 120 (or partition 116).

Figure 3:
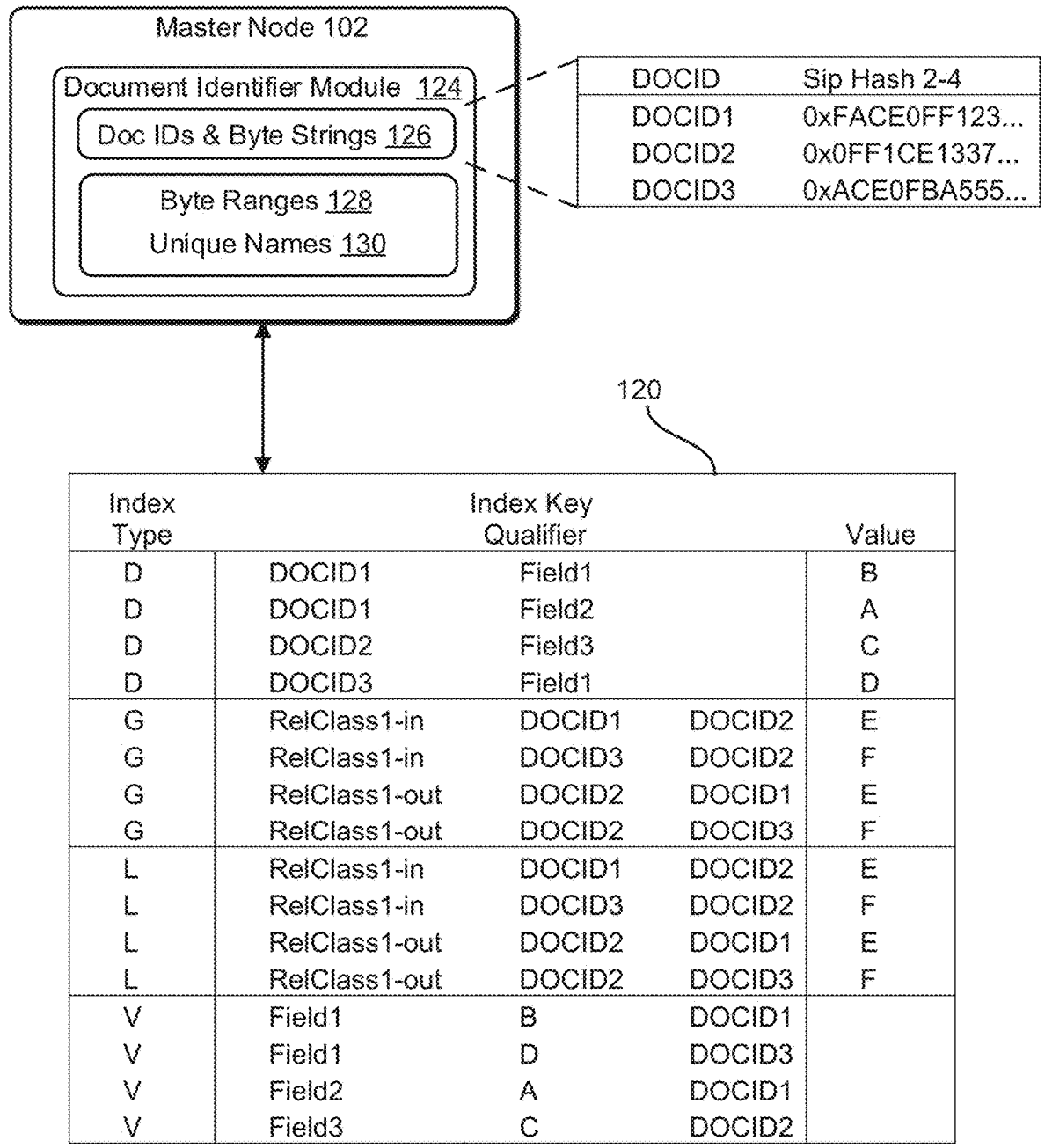
FIG. 3 shows an illustrative example of the table associated with the global coordination environment and document identifiers and associated byte strings that may be generated and stored by a document identifier module of the global coordination environment.

FIG. 3 illustrates the table 120 associated with the global coordination environment 102 and document identifiers and associated byte strings 126 that may be generated and stored by the document identifier module 124 of the global coordination environment 102. The hashing technology, facilitated at least in part by the document identifier module 124, searches the table 120 for document identifiers that may be linked to one or more of the indexes in the table 120. Specifically, in this example, the document identifier module 124 searches for DOCIDs that may be associated with the table 120. The document identifier module 124 identifies document identifiers DOCID1, DOCID2, and DOCID3.

The document identifier module 124 assigns a unique byte string 126 to each of the DOCIDs. In this example, each of the byte strings 126 is a SipHash 2-4 hexadecimal byte string, and the values of the byte strings 126 generated by the document identifier module 124 are appropriately chosen to properly range partition a hash space defined by the upper and lower boundaries of the byte strings 126. The use of SipHash 2-4 byte strings 126 is by way of example only, and other numbering schemes may be used by the document identifier module 124 to link DOCIDs with unique numerical values. The document identifier module 124 stores the identified DOCIDs and their respective byte strings 126. The DOCIDs and their respective byte strings 126 may be stored lexicographically, as illustrated in FIG. 3.

Figure 4:
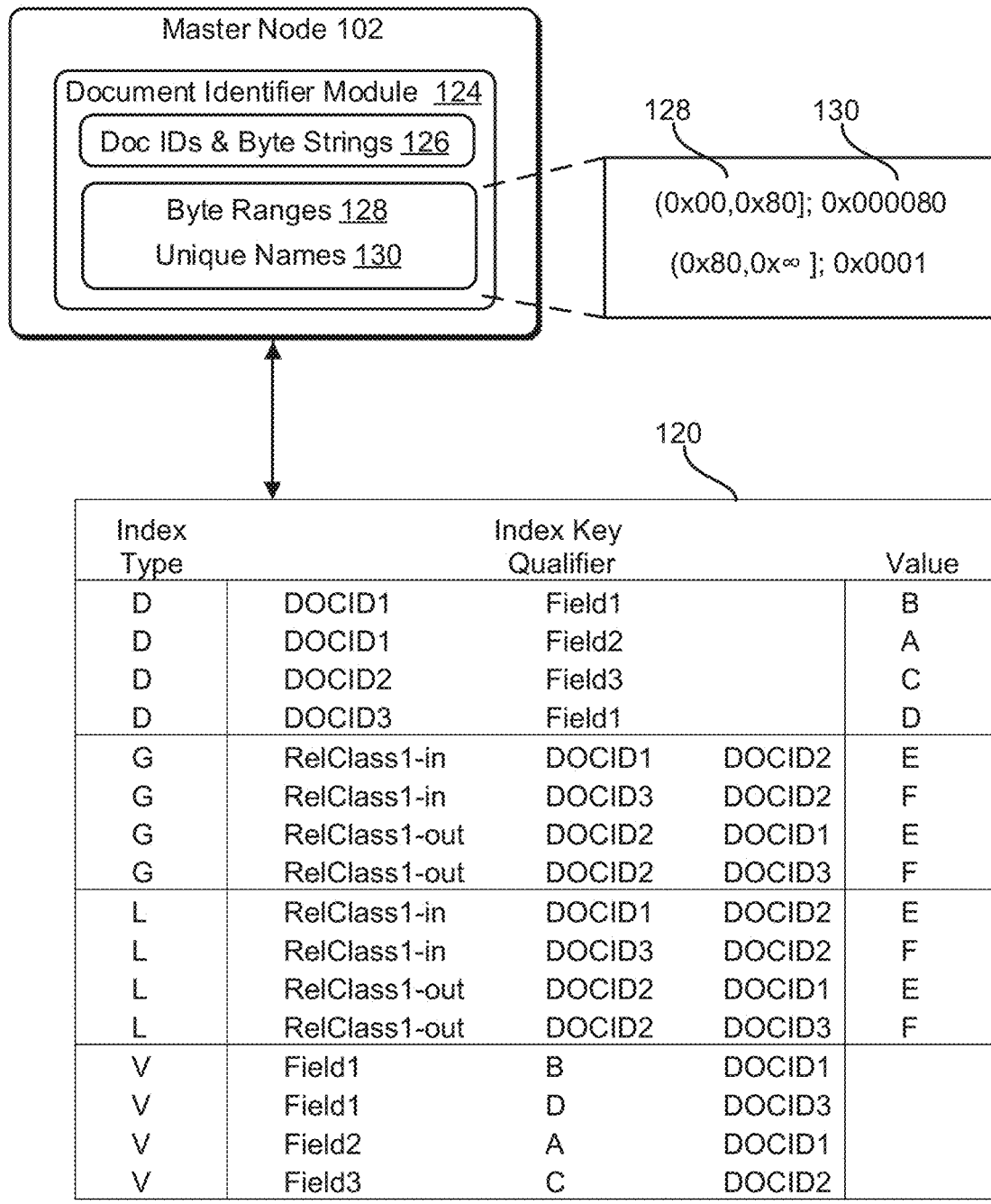
FIG. 4 shows an illustrative example of the table associated with the global coordination environment and byte ranges and associated unique names generated by the document identifier module of the global coordination environment.

FIG. 4 illustrates the table 120 associated with the global coordination environment 102 and byte ranges 128 and associated unique names 130 generated by the document identifier module 124. Based on, at least in part, the number of DOCIDs identified, the document identifier module 124 generates a plurality of byte ranges 128 and associated unique names 130. Each of the byte ranges 128 is unique and is defined by upper and lower byte values, and each of the byte ranges 128 contains a value of at least one of the SipHash 2-4 byte strings 126 assigned to a DOCID#.

Each of the byte ranges 128 is allocated a unique name 130. That unique name 130 may be derived from the upper byte boundary of a corresponding byte range 128. The byte ranges 128 may include an exclusive lower bound and an inclusive upper bound. In naming these byte ranges 128, the document identifier module 124 prepends two bytes to the upper bound, so byte range (0x00,0x80] 128 is assigned the unique name 0x000080 130. The second byte range (0x80, ∞] 128 generated by the document identifier module 124 does not have an upper bound, so the unique name 130 set by the document identifier module 124 is 0x0001 130. The byte ranges 128 are used to partition, filter and sort key/value pairs in the table 120. The unique name 130 associated with each of the byte ranges 128 is stored by the document identifier module 124 and linked to a related byte range 128. While two byte ranges 128 and two unique names 130 are illustrated in FIG. 4, any number of byte ranges and corresponding unique names may be generated for use in a table.

Figure 5:
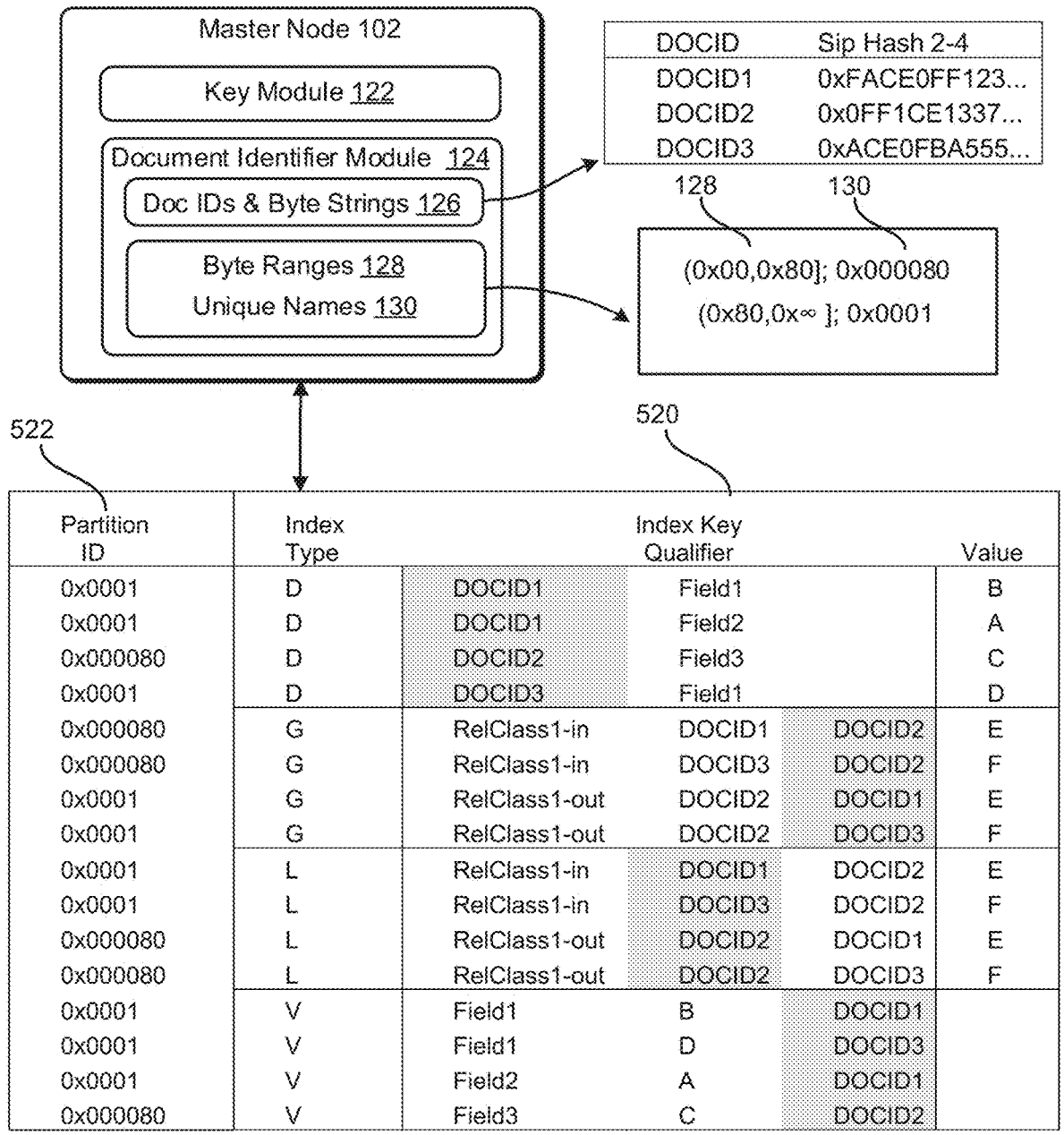
FIG. 5 shows an illustrative example of a modified table associated with the global coordination environment.

FIG. 5 illustrates a modified table 520 associated with the global coordination environment 102. In particular, the table 520 is a modified version of the table 120. The table 520 was augmented by the key module 122 to include a partition ID column 522. The partition ID column 522 includes partition ID entries that include unique names 130, associated with byte ranges 128, stored by the document identifier module 124.

The key module 122 analyzes the table 120 to identify a DOCID in each row. The key module 122 may ignore a row(s) that does not include a DOCID. The DOCIDs identified by the key module 122 are highlighted with gray background in FIG. 5. The SipHash 2-4 byte string 126 assigned to DOCID1 is included in the value range of the byte range (0x80,∞] 128, so the key module 122 enters the unique name 0x000 130 in each of the partition ID entries linked to the rows that include DOCID1. The SipHash 2-4 byte string 126 assigned to DOCID3 is also included in the value range of the byte range (0x80,∞] 128, so the key module 122 enters the unique name 0x0001 130 in each of the partition ID entries linked to the rows that include DOCID3. The SipHash 2-4 byte string 126 assigned to DOCID2 is included in the value range of the byte range (0x00,0x80] 128, so the key module 122 enters the unique name 0x000080 130 in each of the partition ID entries linked to the rows that include DOCID2. The operations performed by the key module 122 generate the modified table 520. As seen in FIG. 5, the keys are out of order. A conventional sorting tool(s), for example, may be used by the key module 122 to sort the table 520. In some implementation, in another operation, which can also be considered a type of sorting, the table 520 may be de-interleaved based on the unique name 130 in the partition ID associated with the keys. This type of sorting process involves a filter operation that filters or groups key/value pairs based on distinct unique names 130 associated with the table 520.

Figure 6:
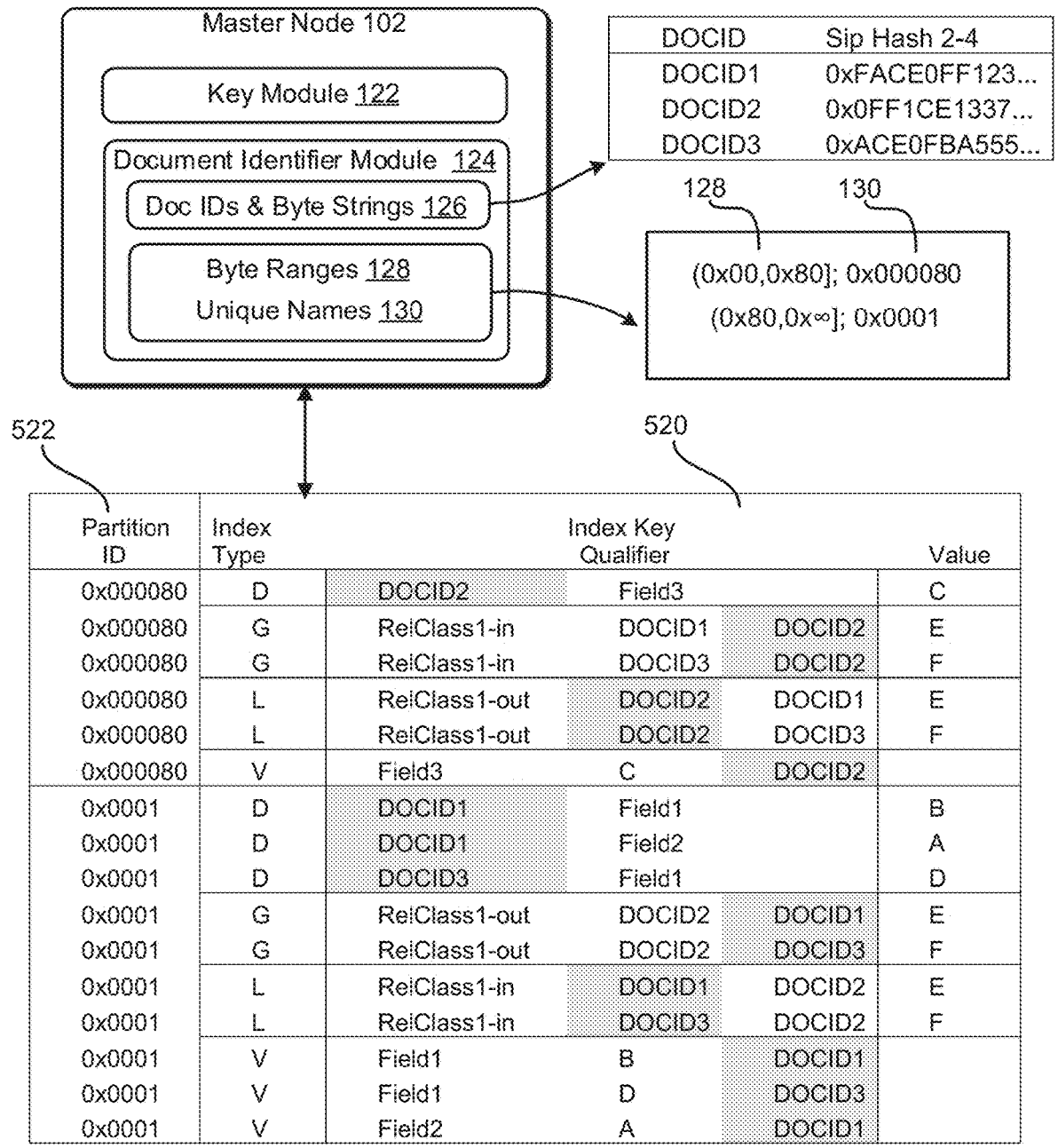
FIG. 6 shows an illustrative example of the modified table with the key/value pairs sorted based on the partition identifier entries in the partition ID column of the modified table.

FIG. 6 illustrates the modified table 520 with the key/value pairs sorted based on the partition ID entries inserted by the key module 122. As is shown by the gray highlighting in FIG. 6, key/value pairs with relevant DOCID2 entries are associated with the byte range (0x00,0x80] 128 and the unique name 0x000080 130, and key/value pairs with relevant DOCID1 and DOCID3 entries are associated with the byte range (0x80,∞] 128 and unique name 0x0001 130. The modified table 520 may be stored in the global coordination environment 102 in additional to the original table 120 stored by the global coordination environment 102. Alternatively, the modified table 520 may be stored in the global coordination environment 102 as a replacement of the original table 120. Furthermore, as described, the same process used to generate the modified table 520 from the original table 120 may be used to generate a modified version of one or more partitions 116.

FIG. 7 illustrates generating a partition 116 from the modified table 520. The global coordination environment 102 may generate multiple partitions 116 from the modified table 520. However, only one such partition 116 is illustrated in FIG. 7. In the illustrated example, the partition 116 generated by the global coordination environment 102 includes key/value pairs linked to the unique name 0x0001 130. A compaction process initiated by the global coordination environment 102 and facilitated by the compactor 106 will generate an RFile 118 that is linked to the partition 116. The RFile 118 is hosted by the file storage layer 108. The global coordination environment 102 may associate the generated partition 116 with one of the partition servers 110. One or more of the clients 114 may query the partition 116 directly by interfacing with the partition server 110 hosting the partition 116. Alternatively, the client 114 may query the partition 116 via indirect connectivity of the partition 166 via the global coordination environment 102.

Figure 8:
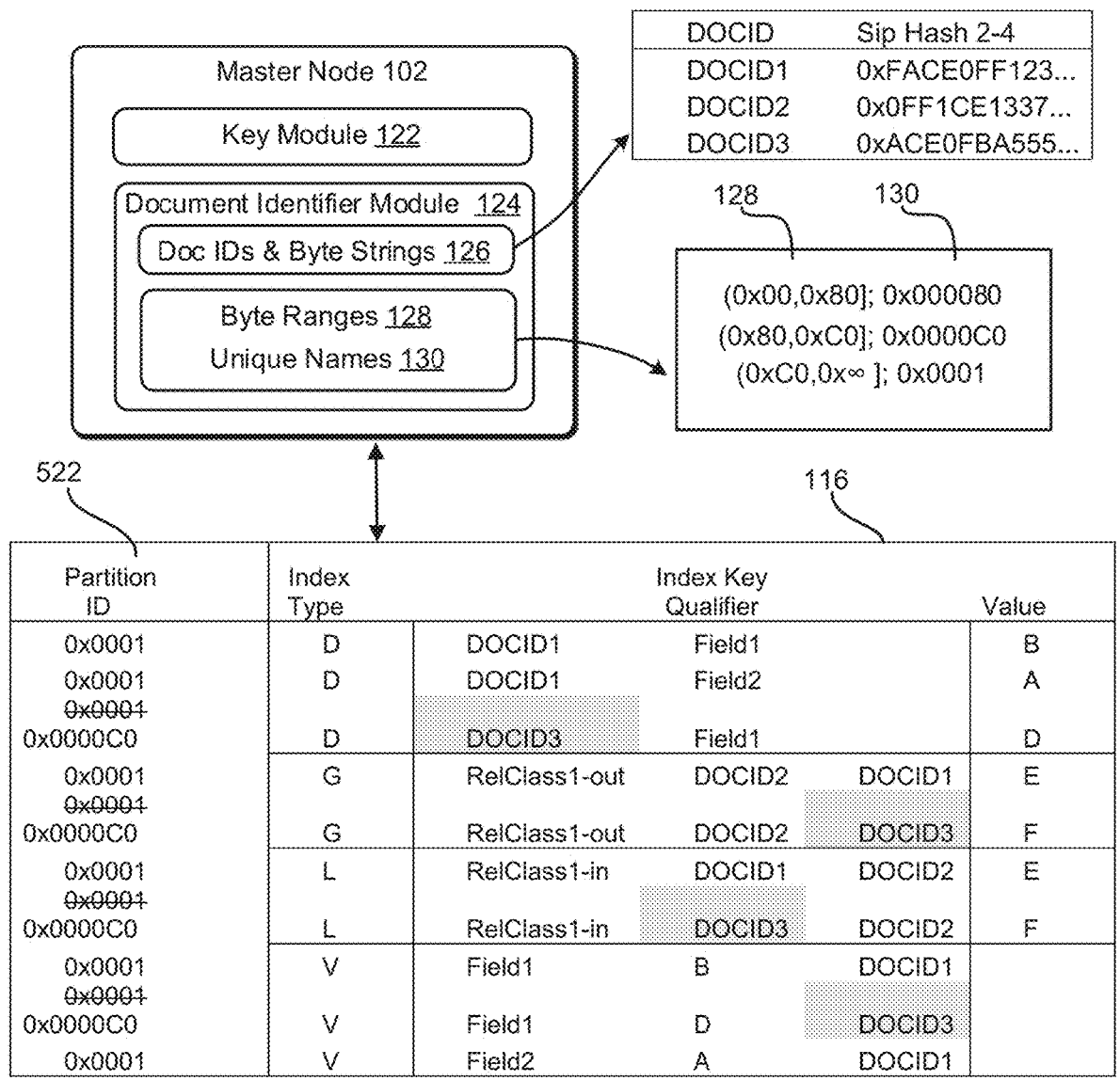
FIG. 8 shows an illustrative example of splitting the partition illustrated in FIG. 7.

FIG. 8 illustrates splitting the partition 116, illustrated in FIG. 7, to generate two partitions 116A and 116B (illustrated in FIG. 9). It may be beneficial to split the table 116 when the partition 116 approaches a maximum size threshold, or when query or sorting performance associated with the partition 116 approaches or falls below a minimum performance threshold. In this example, the global coordination environment 102 determines that the partition 116 is approaching a maximum size threshold (e.g., 50 GB). In that scenario, the document identifier module 124 generates an additional byte range (0x80,0xC0] 128 and associates the unique name 0x0000C0 130 to the additional byte range 128. The additional byte range 128 and the unique name 0x0000C0 130 are stored by the document identifier module 134. Generating the additional byte range 128 may necessitate adjusting one or more of the existing byte ranges 128 stored by the document identifier module 124. In this example, the byte range (0x80,0x∞] 128 is modified to (0xC0,0x∞]. The document identifier module 134 may perform the byte range adjustment.

The key module 122 analyzes the partition 116 to identify a DOCID in each row. The key module 122 may ignore a row(s) that does not include a DOCID. The DOCIDs identified by the key module 122 are highlighted with gray background in FIG. 8. Specifically, the SipHash 2-4 byte string of DOCID3 is less than 0xC0, and the SipHash 2-4 byte string of DOCID1 is greater than 0xC0. Therefore, the key module 122 searches the partition 116 for the partition ID entries linked to DOCID3, and modifies those partition ID entries to change 0x0001 to 0x0000C0. The changes made by the key module 122 are shown in partition ID column 522 of the partition 116.

FIG. 9 illustrates the two tables 116A and 116B generated from splitting the partition illustrated in FIG. 8. Modifying the partition ID entries as described in the foregoing necessitates resorting of the table 116. Specifically, the keys of the partition 116 are out of order. A conventional sorting tool(s), for example, may be used by the key module 122 to sort the partition 116. Alternatively, the key module 122 may implement the sorting technology. In another operation, which can also be considered a type of sorting, the partition 115 may be de-interleaved based on the unique name 130 in the partition ID rows associated with the keys. This type of sorting process involves a filter operation that can retrieve or otherwise access key/value pairs based on the unique names 130 associated with the partition 116. For example, a filter operation may be used to search for key/value pairs that include only the 0x0000C0 partition ID entry and another filter operation may be used to search for key/value pairs that only include the 0x0001 partition ID entry. These filtering operations eliminate having to immediately sort the table 116 to generate the tables 116A and 116B. That is, sorting to generate the tables 116A and 116B may be delayed until right before a scheduled major compaction option.

A major compaction operation may be used to generate a distinct RFile linked to each of the tables 116A and 116B. However, as indicated, that major compaction operation can be delayed. In particular, before the major compaction operation occurs, a logical abstraction of the key/value pairs, facilitated by the SipHash 2-4 byte strings associated with the DOCIDs and the byte ranges 128 that encompass those SipHash 2-4 byte strings, exists that allows filtering and lookups of the key/value pairs in the two partitions 116A and 116B.

Figure 10:
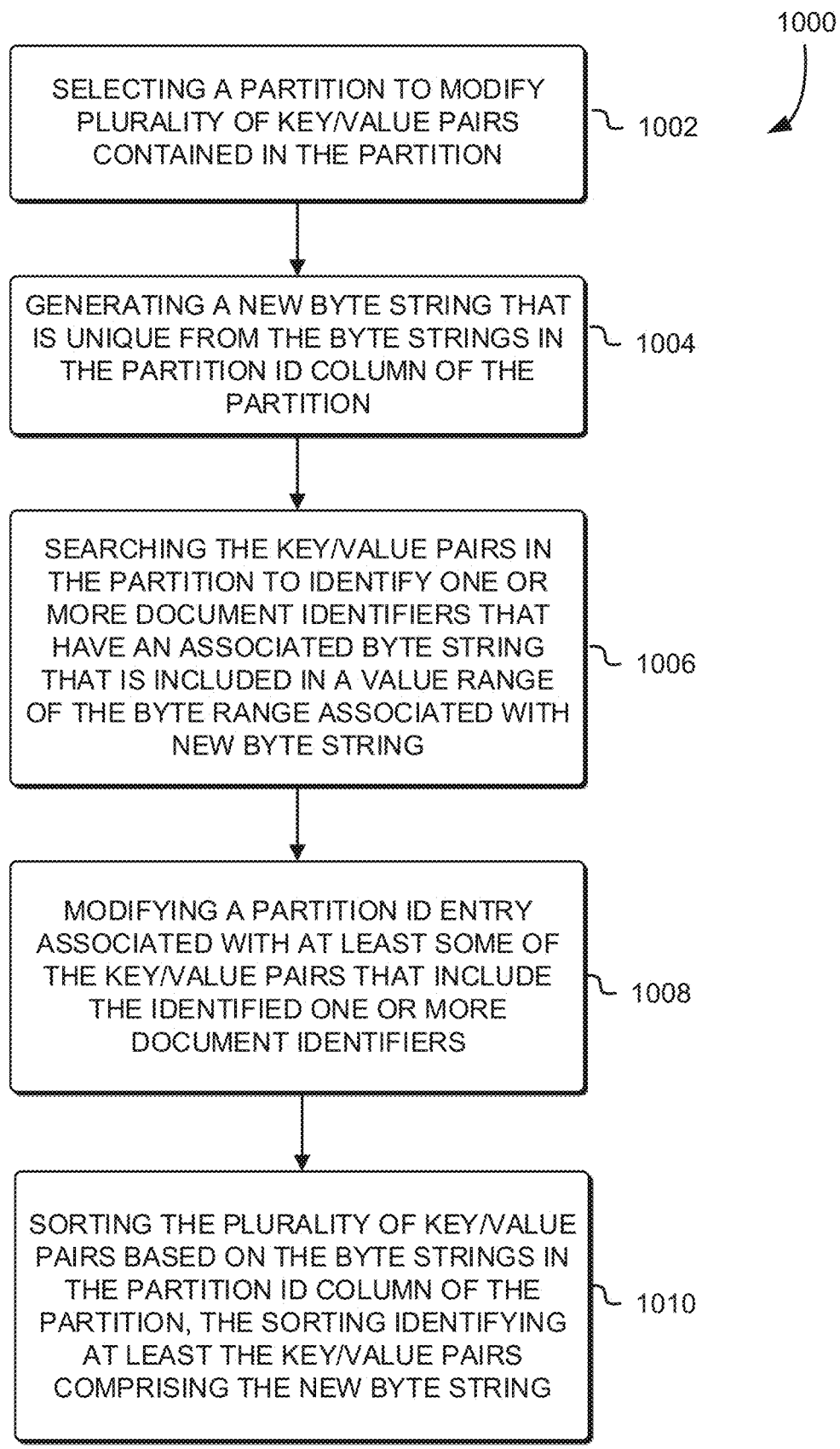
FIG. 10 shows an illustrative example of a process that, as a result of being performed by a global coordination environment or other computing device, generates a modified table or partition in accordance with the described hashing techniques.

FIG. 10 shows an illustrative example of a process 1000 that, as a result of being performed by the global coordination environment 102 or other computing device, generates a modified table or partition in accordance with the described hashing techniques. Modifying the table or partition in the described manner may generate a table or partition that is logically split and ready to undergo a compaction process that allocates a database file to each of the clustered key/value pars in the table or partition. The process 1000 may be performed by any suitable system or combination of systems such as a distributed system implemented in the environment 100 described above in connection with FIG. 1, with various components of the environment 100 performing operations such as described below.

At block 1002, a partition is selected to modify a plurality of key/value pairs contained in the partition. The partition is stored in a partition server and associated with a record file (RFile). The key/value pairs in the table may be sorted or filtered based on byte strings in a partition identifier (ID) column of the partition.

At block 1004, a new byte string is created that is unique from the byte strings in the partition ID column of the table. The new byte string is associated with a byte range that is unique compared to one or more byte ranges associated with the byte strings in the partition ID column of the partition.

At block 1006, the key/value pairs in the partition are searched to identify one or more document identifiers that have an associated byte string that is included in a value range of the byte range associated with new byte string.

At block 1008, a partition ID entry associated with at least some of the key/value pairs that include the identified one or more document identifiers is modified. Specifically, modifying the partition ID entries of the at least some of the key/value pairs involves replacing the byte strings in the partition ID entries of the at least some of the key/value pairs with the new byte string.

At block 1010, the plurality of key/value pairs are sorted based on the byte strings in the partition ID column of the partition, the sorting identifying at least the key/value pairs comprising the new byte string.

Figure 11:
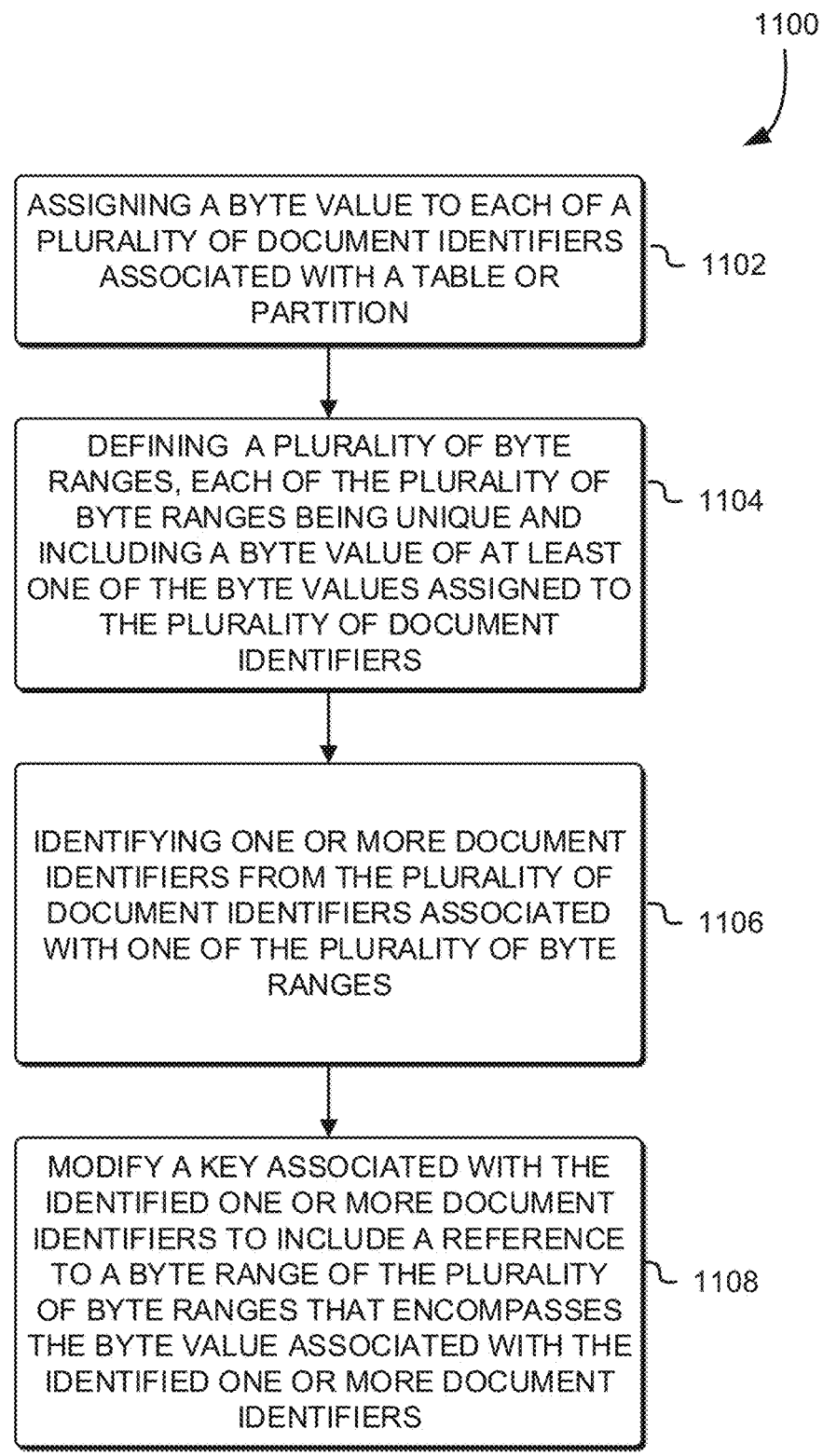
FIG. 11 shows an illustrative example of a process that, as a result of being performed by a global coordination environment or other computing device, generates a modified partition in accordance with the described hashing techniques.

FIG. 11 shows an illustrative example of a process 1100 that, as a result of being performed by the global coordination environment 102 or other computing device, generates a modified partition in accordance with the described hashing techniques. The process 1100 may be performed by any suitable system or combination of systems such as a distributed system implemented in the environment 100 described above in connection with FIG. 1, with various components of the environment 100 performing operations such as described below.

At block 1102, a byte value is assigned to each of a plurality of document identifiers associated with a table or partition hosted by at least one computer implemented server. The table or partition includes forward and secondary indexes referenced in key/value pairs of the table or partition. Furthermore, the keys of the key/value pairs each include at least one of the plurality of document identifiers.

At block 1104, a plurality of byte ranges is defined, each of the plurality of byte ranges being unique and including a byte value of at least one of the byte values assigned to the plurality of document identifiers.

At block 1106, one or more document identifiers from the plurality of document identifiers associated with one of the plurality of byte ranges is identified. The one or more document identifiers is identified using the byte value associated therewith.

At block 1108, a key associated with the identified one or more document identifiers is modified to include a reference to a byte range of the plurality of byte ranges that encompasses the byte value associated with the identified one or more document identifiers.

Figure 12:
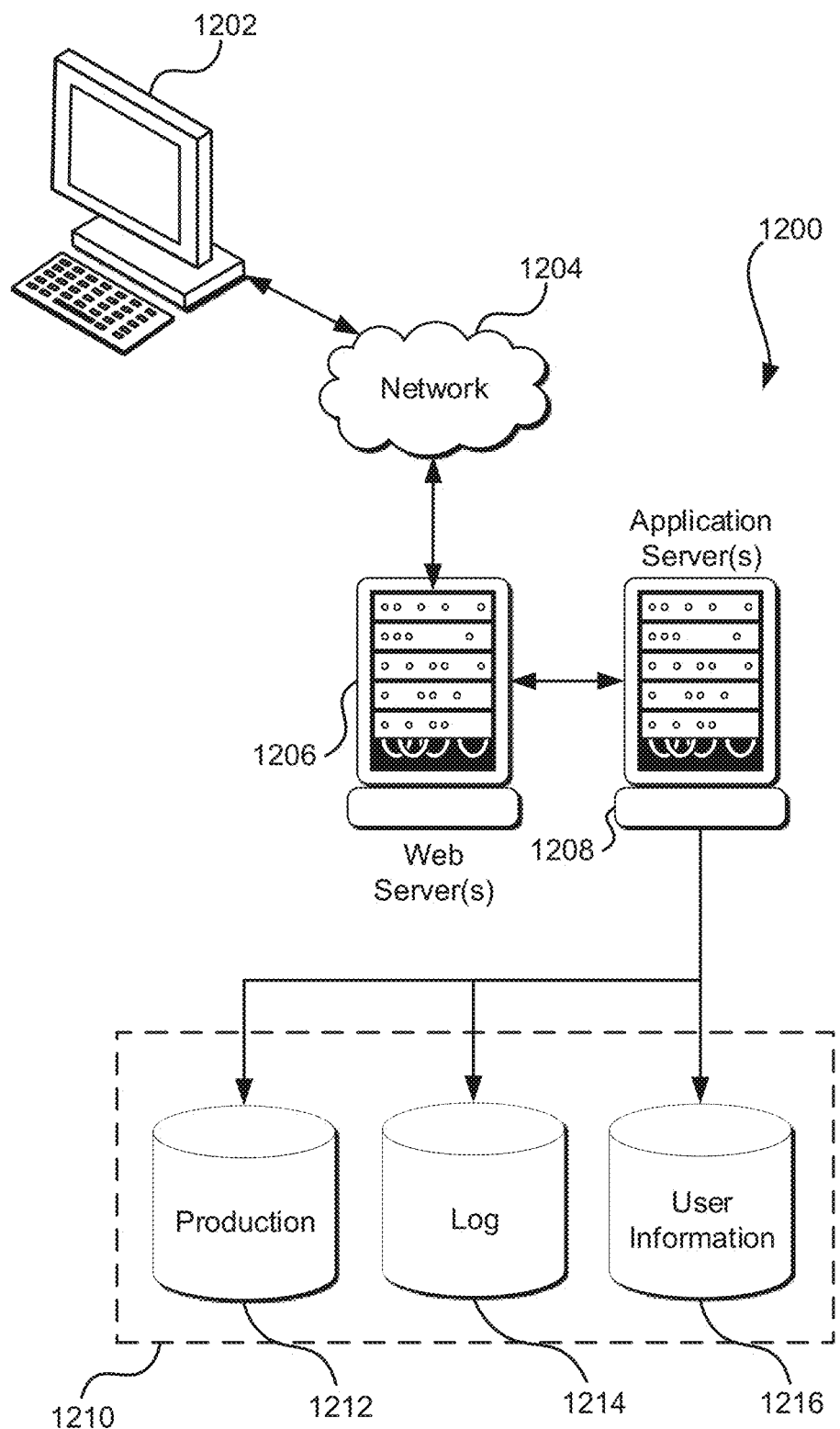
FIG. 12 illustrates a system in which various embodiments can be implemented.

FIG. 12 illustrates aspects of an example system 1200 for implementing aspects in accordance with an embodiment. As will be appreciated, although a web-based system is used for purposes of explanation, different systems may be used, as appropriate, to implement various embodiments. In an embodiment, the system includes an electronic client device 1202, which includes any appropriate device operable to send and/or receive requests, messages, or information over an appropriate network 1204 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1206 for receiving requests and serving content in response thereto, although for other networks an alternative device serving a similar purpose could be used as would be apparent to one of ordinary skill in the art.

In an embodiment, the illustrative system includes at least one application server 1208 and a data store 1210, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1202 and the application server 1208, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1210, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1212 and user information 1216, which are used to serve content for the production side. The data store also is shown to include a mechanism for storing log data 1214, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1210.

The data store 1210, in an embodiment, is operable, through logic associated therewith, to receive instructions from the application server 1208 and obtain, update or otherwise process data in response thereto, and the application server 1208 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1202. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1200 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1200, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method for modifying partition identifier (ID) byte strings associated with one or more key/value pairs included in a partition in advance of splitting the partition, comprising:
    selecting the partition to modify a plurality of key/value pairs contained in the partition, the partition stored in a partition server and associated with a database file, the key/value pairs including byte strings in a partition ID column of the partition;
    generating a new byte string that is unique from the byte strings in the partition ID column of the partition, the new byte string associated with a byte range that is unique compared to one or more byte ranges associated with the byte strings in the partition ID column of the partition;
    searching the key/value pairs in the partition to identify one or more document identifiers that have an associated byte string that is included in a value range of the byte range associated with new byte string;
    modifying a partition ID entry associated with at least some of the key/value pairs that include the identified one or more document identifiers, wherein modifying the partition ID entries of the at least some of the key/value pairs comprises replacing the byte strings in the partition ID entries of the at least some of the key/value pairs with the new byte string; and
    sorting the plurality of key/value pairs based on the byte strings in the partition ID column of the partition, the sorting identifying at least the key/value pairs comprising the new byte string.

2. The computer-implemented method according to claim 1, wherein the sorting identifies key/value pairs comprising the byte string.

3. The computer-implemented method according to claim 1, further comprising splitting the partition to generate two partitions, a first of the two partitions comprising key/value pairs that include the key/value pairs comprising the new byte string and a second of the two partitions comprising the key/value pairs of the partition, less the key/value pairs comprising the new byte string.

4. The computer-implemented method according to claim 1, further comprising generating another database file that includes the key/value pairs with the partition ID entries comprising the new byte string.

5. The computer-implemented method according to claim 1, wherein the one or more document identifiers each corresponds to a hierarchical document having one or more fields, the hierarchical document having at least one field that is included in another hierarchical document.

6. The computer-implemented method according to claim 1, wherein the partition includes forward and secondary indexes referenced in the plurality of key/value pairs.

7. A system, comprising:
    one or more processors;
    memory that stores computer-executable instructions that are executable by the one or more processors to cause the system to:
        assign a byte value to each of a plurality of document identifiers associated with a table or partition hosted by at least one computer implemented server, the table or partition including forward and secondary indexes referenced in key/value pairs of the table or partition, keys of the key/value pairs each including at least one of the plurality of document identifiers;
        define a plurality of byte ranges, each of the plurality of byte ranges being unique and including a byte value of at least one of the byte values assigned to the plurality of document identifiers;
        identify one or more document identifiers from the plurality of document identifiers associated with one of the plurality of byte ranges, the one or more document identifiers identified using the byte value associated therewith; and
        modify a key associated with the identified one or more document identifiers to include a reference to a byte range of the plurality of byte ranges that encompasses the byte value associated with the identified one or more document identifiers.

8. The system according to claim 7, wherein the reference to the byte range is a byte string derived from the byte range of the plurality of byte ranges.

9. The system according to claim 7, wherein each of the byte values assigned to the plurality of document identifiers is a hash value.

10. The system according to claim 7, wherein each of the document identifiers is referenced in an index key qualifier portion of the key/value pairs.

11. The system according to claim 7, wherein each of the plurality of byte ranges comprises an exclusive lower bound defined by a first value and an inclusive upper bound defined by a second value or infinity.

12. The system according to claim 7, wherein modifying the key comprises associating a partition identifier (ID) entry with the key and adding the reference in the partition ID entry.

13. The system according to claim 12, wherein the reference is a string derived from an upper boundary of the byte range of the plurality of byte ranges.

14. A non-transitory computer-readable storage medium storing thereon executable instructions that, as a result of being executed by one or more processors of a computer system, cause the computer system to at least:
    select a partition including a plurality of key/value pairs, the key/value pairs sorted in the partition based on byte strings in a partition identifier (ID) column of the partition;

generate a new byte string that is unique from the byte strings in the partition ID column of the partition, the new byte string associated with a byte range that is unique compared to one or more byte ranges associated with the byte strings in the partition ID column of the partition;

search the key/value pairs in the partition to identify one or more document identifiers that comprise an associated byte string that is included in a value range of the byte range associated with new byte string; and modify a partition ID entry associated with at least some of the key/value pairs that include the identified one or more document identifiers, wherein modifying the partition ID entries of the at least some of the key/value pairs comprises replacing the byte strings in the partition ID entries of the at least some of the key/value pairs with the new byte string.

15. The non-transitory computer-readable storage medium of claim 14, wherein the instructions further comprise instructions that, as a result of being executed by the one or more processors, cause the computer system to filter the plurality of key/value pairs based on the byte strings in the partition ID column of the partition, the filtering identifying key/value pairs that include the new byte string in the partition ID column of the partition.

16. The non-transitory computer-readable storage medium of claim 15, wherein the filtering caused by the computer system identifies a plurality of key/value pairs that include the byte string in the partition ID column of the partition.

17. The non-transitory computer-readable storage medium of claim 14, wherein the instructions further comprise instructions that, as a result of being executed by the one or more processors, cause the computer system to split the partition to generate two partitions, a first of the two partitions comprising key/value pairs that include the key/value pairs comprising the new byte string and a second of the two partitions comprising the key/value pairs of the partition, less the key/value pairs comprising the new byte string.

18. The non-transitory computer-readable storage medium of claim 14, wherein the instructions further comprise instructions that, as a result of being executed by the one or more processors, cause the computer system to generate a database file that includes the key/value pairs with the partition ID entries comprising the new byte string.

19. The non-transitory computer-readable storage medium of claim 14, wherein the one or more document identifiers each corresponds to a hierarchical document having one or more fields, the hierarchical document having at least one field that is included in another hierarchical document.

20. The non-transitory computer-readable storage medium of claim 14, wherein the partition includes forward and secondary indexes referenced in the plurality of key/value pairs.

\* \* \* \* \*